(12) United States Patent
Stewart

(10) Patent No.: US 6,750,285 B1
(45) Date of Patent: Jun. 15, 2004

(54) USE OF ADSORBENTS TO FACILITATE FILM ADHESION

(75) Inventor: John H. Stewart, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/223,781

(22) Filed: Aug. 19, 2002

(51) Int. Cl.[7] .................................. C08F 16/18
(52) U.S. Cl. ................... 524/560; 524/535; 524/492; 524/533; 523/213; 523/177
(58) Field of Search ............... 524/492, 533, 524/535, 560; 523/213, 177

(56) References Cited

U.S. PATENT DOCUMENTS 4,686,247 A * 8/1987 Yosida ................ 523/213
4,710,536 A * 12/1987 Klingen et al. ............ 524/493

* cited by examiner

*Primary Examiner*—David W. Wu
*Assistant Examiner*—Satya B Sastri

(57) ABSTRACT

One embodiment is directed to an adhesive composition that is clear, flexible, and is devoid of non-polar additives and comprises molecules that are polar and particles having a lipophilic surface. In one embodiment, the particles range from 7 nm to 3 $\mu$m in diameter and the adhesive layer is between 0.1 and 5 $\mu$m thick. The particles may be alkyl-converted fumed silica, porous polymer-coated surfaces, or styrene/divinyl benzene polymer. The particles absorb non-polar oils or lubricants that prevent adhesion between printable media and the adhesive layer of the film. The present disclosure is a general solution for oily or lubricated substrates or printed areas. Oily materials are used in inks, dry powder toners, liquid EP toners, and in printers and copiers. The present teachings allow the adhesive to bond well to print media surfaces.

33 Claims, 1 Drawing Sheet

USE OF ADSORBENTS TO FACILITATE FILM ADHESION

TECHNICAL FIELD

The present invention is directed generally to printing with inks, and, more particularly, to enhancing a printed image on a print medium.

BACKGROUND ART

It is difficult to bond to a surface that contains oils or lubricants. The adhesive fails to bond because it has poor contact with the intended substrate.

Many types of printed media, including paper, have a lubricant or oil added to the surface of the media before or during the printing process. Types of printing that add oil or lubricant to the process include laser printers, oil-based ink press printing, and liquid electrophotographic (EP) toner printing. Examples of such materials include sizing agents applied to paper in the paper-making process and lubricants on EP fusers to prevent toner from adhering to paper.

A clear plastic film such at polyethylene terephthalate can be used to coat the print in order to protect it or to improve its image quality. A thin layer of adhesive is used to bond the film to the media. However, the oils or lubricant from the printing process prevent the film from adhering well to the media's surface or image's surface.

A prior solution using particles in an adhesive layer to improve adhesion between a clear film and a printable substrate was developed by Hewlett-Packard. Those particles were used for paper where excess water from Inkjet printing inhibited good adhesion. Hydrophilic silica was used to absorb some of the water. That was found to improve adhesion. However, that solution only addresses water in paper.

Accordingly, a need remains for adhering a thin transparent film to printed media that have oily or lubricated substrates.

SUMMARY

One embodiment of the invention is directed to an adhesive composition that is clear, flexible, and is devoid of non-polar additives and comprises molecules that are polar and particles having a lipophilic surface. In one embodiment, the particles range from 7 nm to 3 $\mu$m in diameter and the adhesive layer is between 0.1 and 5 $\mu$m thick. The particles may be alkyl-converted fumed silica, porous polymer-coated surfaces, or styrene/divinyl benzene polymer. The preferred concentration of particles in the adhesive layer is between 1% and 70% by weight. The particles absorb non-polar oils or lubricants that prevent adhesion between printable media and the adhesive layer of the film.

The present disclosure is a general solution for oily or lubricated substrates or printed areas. Oily materials are used in inks, dry powder toners, liquid EP toners, and in printers and copiers. The present teachings allow the adhesive to bond well to print media surfaces.

BEST MODES FOR CARRYING OUT THE INVENTION

Figure 1:
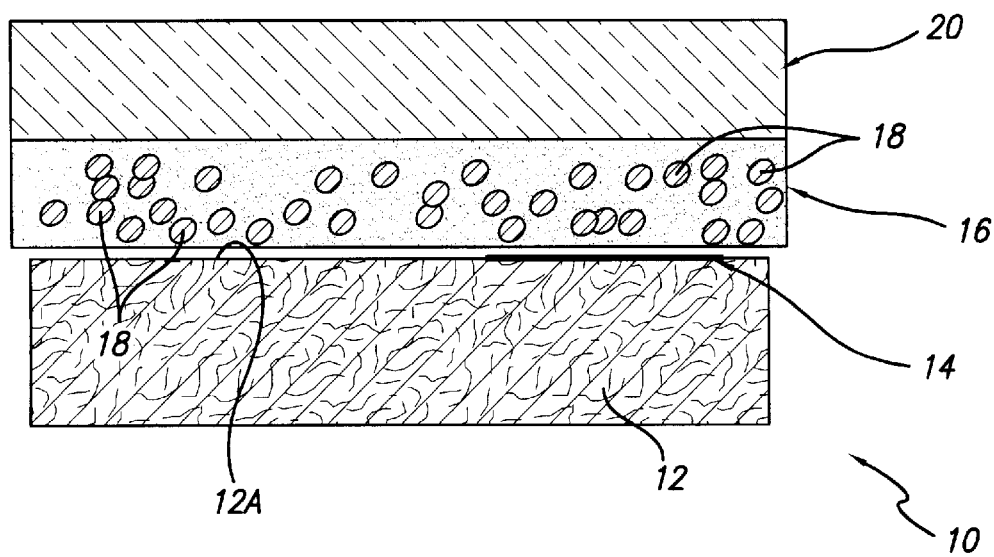
FIG. 1 is a cross-sectional view, depicting a clear overcoat film adhered to a printed paper media with an adhesive layer containing lipophilic particles.

The adhesion of clear plastic films to print media can be improved upon by removing some of the interfering chemicals. If the adhesive layer contains particles that readily absorb these oils or lubricants, the contact at the surface of the adhesive and substrate can be improved.

FIG. 1 depicts an embodiment of a coated printed paper 10 accordance with the teachings herein. The coated printed paper 10 comprises a prints medium substrate 12, a portion of a print 14 on a surface 12A of the substrate 12, and an adhesive layer 16 containing lipophilic particles 18 covering the print. A clear overcoat film 20 is then formed on the adhesive layer 16.

In accordance with the embodiments disclosed herein, particles 18 from 7 nm to 3 $\mu$m diameter having a lipophilic surface are included in the adhesive layer 16 of a thin transparent film 20. The adhesive layer 16 is between 0.1 and 5 $\mu$m thickness. The adhesive layer 16 is clear, flexible, and is devoid of non-polar additives and comprises molecules that are polar. Preferably, the adhesive 16 is composed of acrylate-based polymers or other transparent bondable composites. An example of such an acrylate-based polymer is a combination of an acrylic ester and acrylic acid. Another example comprises a styrene-acrylate formulation.

Examples of suitable lipophilic particles 18 include alkyl-converted fumed silica, porous polymer-coated surfaces, and styrene/divinyl benzene polymer. The concentration of particles 18 in the adhesive layer 16 is between 1% and 70% by weight. The particles 18 absorb non-polar oils or lubricants that prevent adhesion between printable media 12 and the adhesive layer of the film 16.

Transparent films 20 such as PET (polyethylene terephthalate) and polyethylene are more securely adhered to print media 12 using the modified adhesive 16. The film 20 is preferably transparent, and preferably comprises a plastic material.

The particle diameters may vary, due to the type of particle employed. For example, fumed silica particles range from 10 to 100 nm in diameter, while solid polymers are typically limited by production techniques to larger diameters.

Preferably, the concentration of the lipophilic particles 18 is in the range of about 2 to 10 percent by volume (vol %), since they influence the conformability of the adhesive layer 16. Less than about 2 vol % does not result in sufficient beneficial improvement, while greater than about 10 vol % limits the flow ability of the adhesive layer 16 when it is formed.

Lipophilic fumed silica is available from a number of manufacturers. Examples of fumed silica beneficially employed in the practice of the teachings herein include hexamethylenedisilazane (e.g., available from Degussa as AEROSIL R104) and cyclosiloxane (e.g., available from Degussa as AEROSIL RX200), both of which are treated fumed silicas.

An example of a porous polymer-coated surface is a porous solid such as a sub-micron irregular silica gel with an octadecylsilane-converted surface.

An example of a styrene/vinyl benzene polymer is semi-porous styrene copolyvinylbenzene having a particle diameter in the range of 0.3 to 3 $\mu$m.

For a pressure-sensitive adhesive, an example formulation is 74% 2-ethylhexyl acrylate, 19% vinyl acetate, 4% acrylic acid, 1% N-methylolacrylamide, and 2% lipophilic fumed silica.

For an adhesive film used in a heat/pressure application of the adhesive, an example formulation is 28% ethylene terephthalate, 69% sebacic acid, 1% tetra-isopropyl titanate, and 2% lipophilic fumed silica.

The transparent film 20 is adhered to the print media 12 using a set of conformable rollers (not shown). For example, media 12 traveling at 1 inch per second is coated with the transparent film 20 having the adhesive 18 on one side using metal rollers coated with an elastomer. The rollers exert an exemplary nip pressure of 100 psi. For print media 12 and adhesive 18 requiring heat to facilitate bonding of the film 20, the pressure roller is heated in excess of 100° C.

The film 20 that is adhered to the print media 12 enhances the printed image 14, including gloss, as well as protects the printed image.

INDUSTRIAL APPLICABILITY

The addition of particles having a lipophilic surface is expected to find use in adhering clear plastic films to print media.

What is claimed is:

1. An adhesive composition that is clear, flexible, and comprises an acrylate-based polymer, said adhesive composition further comprising particles having a lipophilic surface and otherwise being devoid of non-polar additives, wherein said adhesive composition adheres a film to printed print media having an oil or lubricant thereon.

2. The adhesive composition of claim 1 wherein said particles have a diameter within a range of 7 nm to 3 $\mu$m.

3. The adhesive composition of claim 1 wherein said adhesive layer on said print medium has a thickness within a range of 0.1 and 5 $\mu$m.

4. The adhesive composition of claim 1 wherein said acrylate-based polymer comprises a polymerized acrylic ester and acrylic acid.

5. The adhesive composition of claim 1 where said acrylate-based polymer comprises a styrene-acrylate polymer.

6. The adhesive composition of claim 1 wherein said particles having a lipophilic surface are selected from the group consisting of alkyl-converted fumed silica, porous polymer-coated surfaces, and styrene/divinyl benzene polymer.

7. The adhesive composition of claim 1 wherein said particles in said adhesive composition have a concentration of between 1% and 70% by weight, based on the total composition.

8. The adhesive composition of claim 7 wherein said particles in said adhesive composition have a concentration of between 2% and 10% by volume, based on the total composition.

9. The adhesive composition of claim 1 wherein said film is transparent.

10. The adhesive composition of claim 1 wherein said film is plastic.

11. The adhesive composition of claim 1 wherein said film is selected from the group consisting of polyethylene terephthalates and polyethylene.

12. A method for improving adhesion of a film to print media having an oil or lubricant thereon, said method comprising:

providing an adhesive composition that is clear, flexible, and comprises an acrylate-based polymer;

adding particles having a lipophilic surface to said adhesive composition, said adhesive composition otherwise being devoid of non-polar additives; and adhering said film to said printed print media.

13. The method of claim 12 wherein said particles have a diameter within a range of 7 nm to 3 $\mu$m.

14. The method of claim 12 wherein said adhesive layer has a thickness within a range 0.1 and 5 $\mu$m.

15. The method of claim 12 wherein said acrylate-based polymer comprises a polymerized acrylic ester and acrylic acid.

16. The method of claim 12 herein said acrylate-based polymer comprises a styrene-acrylate polymer.

17. The method of claim 12 wherein said particles having a lipophilic surface are selected from the group consisting of alkyl-converted fumed silica, porous polymer-coated surfaces, and styrene/divinyl benzene polymer.

18. The method of claim 12 wherein said particles in said adhesive composition have a concentration of between 1% and 70% by weight, based on the total composition.

19. The method of claim 18 wherein said particles in said adhesive composition have a concentration of between 2% and 10% by volume, based on the total composition.

20. The method of claim 12 wherein said film is transparent.

21. The method of claim 12 wherein said film is plastic.

22. The method of claim 12 wherein said film is selected from the group consisting of polyethylene terephthalates and polyethylene.

23. An article comprising (a) a printed print media having an oil or lubricant thereon, (b) a film adhered thereto, and (c) an adhesive composition adhering said film to said printed print media, wherein said adhesive composition is clear, flexible, and comprises an acrylate-based polymer, said adhesive composition further comprising particles having a lipophilic surface, said adhesive composition otherwise being devoid of non-polar additives.

24. The article of claim 23 wherein said particles have a diameter within a range of 7 nm to 3 $\mu$m.

25. The article of claim 23 wherein said adhesive layer on said print medium has a thickness within a range of 0.1 and 5 $\mu$m.

26. The article of claim 23 wherein said acrylate-based polymer comprises a polymerized acrylic ester and acrylic acid.

27. The article of claim 23 wherein said acrylate-based polymer comprises a styrene-acrylate polymer.

28. The article of claim 23 wherein said particles having a lipophilic surface are selected from the group consisting of alkyl-converted fumed silica, porous polymer-coated surfaces, and styrene/divinyl benzene polymer.

29. The article of claim 23 wherein said particles in said adhesive composition have a concentration of between 1% and 70% by weight, based on the total composition.

30. The article of claim 29 wherein said particles in said adhesive composition have a concentration of between 2% and 10% by volume, based on the total composition.

31. The article of claim 23 wherein said film is transparent.

32. The article of claim 23 wherein said film is plastic.

33. The article of claim 23 wherein said film is selected from the group consisting of polyethylene terephthalates and polyethylene.

* * * * *